US012700583B2

(12) United States Patent
Qu et al.

(10) Patent No.: US 12,700,583 B2
(45) Date of Patent: Aug. 4, 2026

(54) SILICON-OXYGEN COMPOSITE MATERIAL, ANODE MATERIAL, ANODE AND LITHIUM ION BATTERY AND PREPARATION METHOD THEREOF

(71) Applicants: BTR NEW MATERIAL GROUP CO., LTD., Shenzhen (CN); Dingyuan New Energy Technology Co., LTD., Huizhou (CN)

(72) Inventors: Lijuan Qu, Shenzhen (CN); Chunlei Pang, Shenzhen (CN); Zhiqiang Deng, Shenzhen (CN); Jianguo Ren, Shenzhen (CN); Xueqin He, Shenzhen (CN)

(73) Assignees: BTR NEW MATERIAL GROUP CO., LTD., Shenzhen (CN); DINGYUAN NEW ENERGY TECHNOLOGY CO., LTD., Huzhou (CN)

( * ) Notice: Subject to any disclaimer, the term of this patent is extended or adjusted under 35 U.S.C. 154(b) by 721 days.

(21) Appl. No.: 18/042,454

(22) PCT Filed: May 7, 2021

(86) PCT No.: PCT/CN2021/092174
§ 371 (c)(1),
(2) Date: Feb. 21, 2023

(87) PCT Pub. No.: WO2022/041831
PCT Pub. Date: Mar. 3, 2022

(65) Prior Publication Data
US 2023/0352657 A1 Nov. 2, 2023

(30) Foreign Application Priority Data
Aug. 31, 2020 (CN) .......................... 202010898585.9

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0471* (2013.01); *H01M 4/366* (2013.01);
(Continued)

(58) Field of Classification Search
CPC ..... H01M 4/131; H01M 4/386; H01M 4/1391
See application file for complete search history.

(56) References Cited

U.S. PATENT DOCUMENTS

| | | | |
|---|---|---|---|
| 2014/0030599 A1 | 1/2014 | Lee et al. | |
| 2018/0316001 A1 | 11/2018 | Kim et al. | |
| 2020/0058924 A1* | 2/2020 | Pang | ................... H01M 4/5825 |

FOREIGN PATENT DOCUMENTS

| | | |
|---|---|---|
| CN | 102214823 A | 10/2011 |
| CN | 104620427 A | 5/2015 |
(Continued)

OTHER PUBLICATIONS

ISA China National Intellectual Property Administration, International Search Report Issued in Application No. PCT/CN2021/092174, Aug. 9, 2021, WIPO, 5 pages.
(Continued)

*Primary Examiner* — Khanh T Nguyen
(74) *Attorney, Agent, or Firm* — McCoy Russell LLP

(57) ABSTRACT

Providing a silicon-oxygen composite material, an anode material and a preparation method thereof. The silicon-oxygen composite material has a size D10 of in a range of 3.0 μm to 8.2 μm. In the present disclosure, by controlling the particle size D10 of the silicon-oxygen composite material to between 3.0 μm and 8.2 μm, on the one hand, the uniformity of pre-lithiation can be improved, the nano- (Continued)

silicon cannot be exposed on a surface of the particles, and desired improvement of initial Coulombic efficiency and good cycle stability can be obtained; on the other hand, the silicon-oxygen composite material has a suitable electron and ion conduction channels, and internal resistance of the particles is small, which improves the rate performance and cycle performance of the material.

15 Claims, 4 Drawing Sheets

(51) Int. Cl.
  *H01M 4/58*      (2010.01)
  *H01M 4/583*     (2010.01)
  *H01M 4/02*      (2006.01)

(52) U.S. Cl.
  CPC ......... *H01M 4/5825* (2013.01); *H01M 4/583* (2013.01); *H01M 2004/021* (2013.01); *H01M 2004/027* (2013.01)

(56) References Cited

FOREIGN PATENT DOCUMENTS

| CN | 105612636 | A |   | 5/2016 | |
| CN | 106654194 | A |   | 5/2017 | |
| CN | 106816594 | A |   | 6/2017 | |
| CN | 107851789 | A |   | 3/2018 | |
| CN | 108461723 | A |   | 8/2018 | |
| CN | 109950485 | A | * | 6/2019 | ........ H01M 10/0525 |
| CN | 110391406 | A |   | 10/2019 | |
| CN | 110707310 | A |   | 1/2020 | |
| CN | 110931764 | A |   | 3/2020 | |
| CN | 110970600 | A |   | 4/2020 | |
| CN | 111092199 | A | * | 5/2020 | .............. H01M 4/36 |
| CN | 111180693 | A |   | 5/2020 | |
| CN | 111313004 | A |   | 6/2020 | |
| CN | 108461723 | B |   | 8/2020 | |
| CN | 111509288 | A | * | 8/2020 | ........... H01M 4/139 |
| CN | 111584848 | A |   | 8/2020 | |
| CN | 111710845 | A |   | 9/2020 | |
| EP | 3496189 | A1 |   | 6/2019 | |
| EP | 3598541 | A1 |   | 1/2020 | |
| JP | 2010205609 | A | * | 9/2010 | ........... Y02E 60/10 |
| JP | 2016506035 | A |   | 2/2016 | |
| JP | 2016164884 | A |   | 9/2016 | |
| JP | 2017531276 | A |   | 10/2017 | |
| JP | 2018014188 | A |   | 1/2018 | |
| JP | 2019133920 | A |   | 8/2019 | |
| JP | 2019530190 | A |   | 10/2019 | |
| JP | 2019220350 | A |   | 12/2019 | |
| JP | 2020019702 | A |   | 2/2020 | |
| WO | 2014129594 | A1 |   | 8/2014 | |
| WO | WO 2015059859 | A1 | * | 4/2015 | ........... H01M 4/625 |
| WO | 2015125784 | A1 |   | 8/2015 | |
| WO | 2016035290 | A1 |   | 3/2016 | |
| WO | 2017208627 | A1 |   | 12/2017 | |

OTHER PUBLICATIONS

State Intellectual Property Office of the People's Republic of China, Office Action and Search Report Issued in Application No. 202010898585.9, Apr. 8, 2022, 20 pages. (Submitted with Partial Translation).
State Intellectual Property Office of the People's Republic of China, Office Action and Search Report Issued in Application No. 202010898585.9, Jan. 5, 2023, 10 pages. (Submitted with Partial Translation).
"A Basic Guide to Particle Characterization," Malvern Instruments Worldwide—White Paper, Available Online at https://www.cif.iastate.edu/files/inline-files/Particle%20Characterization%20Guide.pdf, May 2, 2012, 26 pages.
European Patent Office, Extended European Search Report Issued in Application No. 21859678.1, Sep. 9, 2024, Germany, 13 pages.
Japan Patent Office, Notice of Allowance Issued in Application No. 2023-504667, Mar. 5, 2025, 6 pages. (Submitted with Machine Translation).

* cited by examiner

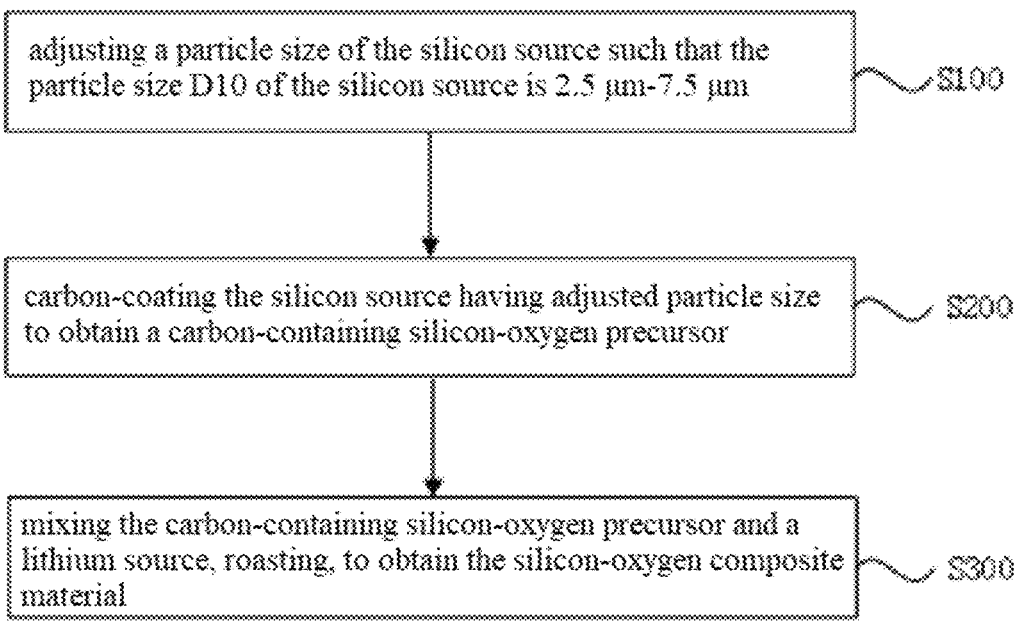

adjusting a particle size of the silicon source such that the particle size D10 of the silicon source is 2.5 μm-7.5 μm          S100 carbon-coating the silicon source having adjusted particle size to obtain a carbon-containing silicon-oxygen precursor          S200 mixing the carbon-containing silicon-oxygen precursor and a lithium source, roasting, to obtain the silicon-oxygen composite material          S300

Fig. 3

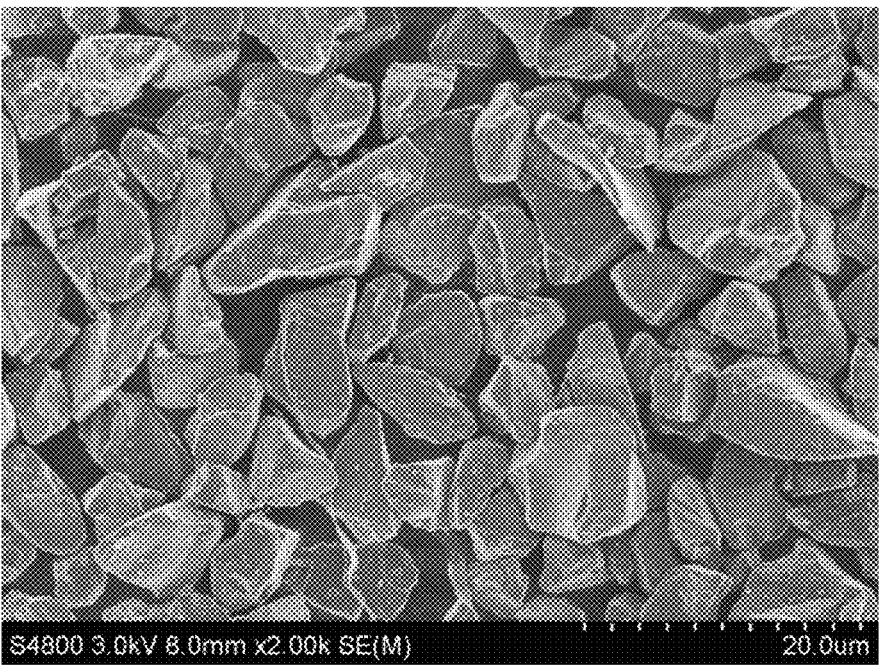

SILICON-OXYGEN COMPOSITE MATERIAL, ANODE MATERIAL, ANODE AND LITHIUM ION BATTERY AND PREPARATION METHOD THEREOF

CROSS REFERENCE TO RELATED APPLICATIONS

This application is a National Stage of International Application No. PCT/CN2021/092174 filed May 7, 2021, which claims the benefit of priority to Chinese Patent Application No. 202010898585.9, titled "SILICON-OXYGEN COMPOSITE MATERIAL, PREPARATION METHOD THEREOF, ANODE MATERIAL AND LITHIUM-ION BATTERY" filed to CNIPA on Aug. 31, 2020, the content of which is are incorporated herein by reference.

TECHNICAL FIELD

The disclosure belongs to the technical field of battery material, and relates to a silicon-oxygen composite material, an anode material, an anode, a lithium ion battery and a preparation method thereof.

BACKGROUND

Lithium ion battery has been widely used in portable electronic products and electric vehicles due to its advantages such as high working voltage, long cycle life, no memory effect, less self-discharge, and environmental friendliness.

Currently, commercial lithium-ion battery mainly adopts a graphite-based anode material, however, the theoretical specific capacity thereof is only 372 mAh/g, which cannot meet the requirement for high energy density of future lithium-ion battery. Although the theoretical capacity of existing Si is as high as 4200 mAh/g, the expansion rate thereof reaches 300%, which affects the cycle performance and restricts the market promotion and application. In comparison, a silicon-oxygen material has better cycle performance, but a low initial efficiency. When charging for the first time, 20%-50% of lithium will be consumed for SEI film formation, which greatly reduces the initial Coulombic efficiency.

At present, pre-lithiation is widely studied method to improve the initial Coulombic efficiency of a silicon-oxygen material. However, it will also bring about cycle degradation to the silicon-oxygen material when the initial Coulombic efficiency is improved after pre-lithiation. In order to enhance the application value of a pre-lithiation material, it is very important to improve the cycle performance of the pre-lithiation material, which at the same time, also greatly promotes development and application of a silicon-based material.

As in many other methods, although the initial Coulombic efficiency is improved by doping lithium, it brings many problems such as a poor improvement of cycle effect of the obtained silicon-based anode or cycle degradation of silicon-oxygen material.

In view of this, it is necessary to provide a silicon-oxygen composite material with good cycle performance after lithium doping, as well as excellent initial Coulombic efficiency and gram capacity, a preparation method thereof, an anode material and a lithium ion battery.

SUMMARY

The present disclosure provides a silicon-oxygen composite material including an inner core and a carbon layer formed on a surface of the inner core, where the inner core includes a lithium-containing compound and a non-metallic silicon-containing material, the non-metallic silicon-containing material includes at least one of nano-silicon and silicon oxide, the non-metallic silicon-containing material is dispersed in the lithium-containing compound; and the silicon-oxygen composite material has a size D10 of 3.0 $\mu$m to 8.2 $\mu$m.

In some embodiments, the lithium-containing compound includes at least one of lithium silicate, lithium carbonate, lithium aluminate, and lithium nitrate.

In some embodiments, the lithium-containing compound further includes at least one of lithium chloride, lithium nitride, lithium carbide, lithium sulfide, and lithium sulfate.

In some embodiments, the silicon oxide has a chemical formula of $SiO_x$, where $0 < x \leq 1.8$.

In some embodiments, the nano-silicon is dispersed in the silicon oxide, and/or, the nano-silicon is dispersed in the lithium-containing compound.

In some embodiments, a mass ratio of the nano-silicon dispersed in the silicon oxide to the nano-silicon dispersed in the lithium-containing compound is (15-46):(54-75).

In some embodiments, the nano-silicon has a size D50 of 0 to 15 nm, and excluding 0.

In some embodiments, a molar ratio of the nano-silicon to the lithium-containing compound is (0.5-10):1.

In some embodiments, a molar ratio of the silicon oxide to the lithium-containing compound is (0.2-2):1.

In some embodiments, the carbon layer includes, but not limited to, at least one of amorphous carbon, graphene sheet, graphitizable soft carbon, carbon fiber, carbon nanotube, and conductive carbon black.

In some embodiments, a mass content of the carbon layer is 1% to 15% based on 100% by mass of the silicon-oxygen composite material.

In some embodiments, in the silicon-oxygen composite material, the carbon layer has a thickness of 200 nm to 1000 nm.

The present disclosure provides a preparation method of a silicon-oxygen composite material, including the following:

adjusting a particle size of a silicon source such that a particle size D10 of the silicon source is 2.5 $\mu$m to 7.5 $\mu$m;

carbon-coating the silicon source having adjusted particle size to obtain a carbon-containing silicon-oxygen precursor; and mixing the carbon-containing silicon-oxygen precursor and a lithium source, roasting, to obtain the silicon-oxygen composite material;

where the silicon-oxygen composite material has a particle size D10 of 3.0 $\mu$m to 8.2 $\mu$m.

In some embodiments, a method for preparing the silicon source includes: heating a raw material capable of producing silicon oxide gas under an inert atmosphere to produce silicon oxide gas, and obtaining the silicon source after cooling down.

In some embodiments, the silicon source is silicon monoxide.

In some embodiments, the inert atmosphere includes at least one of helium atmosphere, neon atmosphere, argon atmosphere, krypton atmosphere, xenon atmosphere, and nitrogen atmosphere; In some embodiments, a temperature of the heating is 900° C. to 1500° C.

In some embodiments, the raw material capable of producing silicon oxide gas is a mixture of Si and $SiO_2$.

In some embodiments, a method for adjusting a particle size includes at least one of crushing, ball milling, and classification.

In some embodiments, a method for the carbon-coating includes at least one of a gas-phase carbon-coating process and a solid-phase carbon-coating process.

In some embodiments, the gas-phase carbon-coating process includes: mixing the silicon source having adjusted particle size and an organic carbon source under a protective atmosphere, and heating to obtain the carbon-containing silicon-oxygen precursor.

In some embodiments, a gas in the protective atmosphere includes at least one of hydrogen, nitrogen, helium, neon, argon, krypton, and xenon.

In some embodiments, the carbon source includes an organic carbon source that is decomposed to form a carbon layer at a heating temperature of 600° C. to 1000° C.

In some embodiments, the organic carbon source includes at least one of alkane, alkene, alkyne, ketone, and aromatic hydrocarbon.

In some embodiments, the organic carbon source includes at least one of methane, ethylene, acetylene, acetone, and benzene.

In some embodiments, the heating temperature is 600° C. to 1000° C.

In some embodiments, the solid-phase carbon-coating process includes: fusing the silicon source having an adjusted particle size with a coated carbon source, and obtaining the carbon-containing silicon-oxygen precursor after carbonization.

In some embodiments, a time of the fusing is 0.2 h to 1 h.

In some embodiments, the coated carbon source includes at least one of needle coke, resin, polyol, and enol.

In some embodiments, the coated carbon source includes at least one of coal coke, petroleum coke, sugar, organic acid, and pitch.

In some embodiments, a temperature of the carbonization is 600° C. to 1000° C.

In some embodiments, a time of the carbonization is 3 h to 10 h.

In some embodiments, the carbon-containing silicon-oxygen precursor has a particle size D10 of 3.0 μm to 8.2 μm.

In some embodiments, the lithium source includes an oxygen-free lithium compound.

In some embodiments, the lithium source includes at least one of lithium hydride, lithium amide, alkyl lithium, lithium aluminum hydride, lithium element, and lithium borohydride.

In some embodiments, the lithium source has a particle size D10 of 0.5 μm to 10 μm.

In some embodiments, a molar ratio of the carbon-containing silicon-oxygen precursor to the lithium source is (1.4-3):1.

In some embodiments, a manner of mixing the carbon-containing silicon-oxygen precursor and the lithium source includes at least one of VC mixing, blending, fusion, kneading, dispersion, and stirring.

In some embodiments, the roasting is performed in a non-oxygen atmosphere.

In some embodiments, the non-oxygen atmosphere includes at least one of a vacuum atmosphere, a hydrogen atmosphere, a nitrogen atmosphere, a helium atmosphere, a neon atmosphere, an argon atmosphere, a krypton atmosphere, and a xenon atmosphere.

In some embodiments, a temperature of the roasting is 300° C. to 1000° C., optionally 450° C. to 800° C.

In some embodiments, the preparation method of a silicon-oxygen composite material includes the following:

heating a mixture of Si and $SiO_2$ to 900° C. to 1500° C. under an inert atmosphere to produce silicon oxide gas, cooling down, and adjusting particle size, to obtain a silicon source with a particle size D10 of 2.5 μm to 7.5 μm;

carbon-coating the silicon source having adjusted particle size to obtain a carbon-containing silicon-oxygen precursor with a particle size D10 of 3.0 μm to 8.2 μm; and mixing the carbon-containing silicon-oxygen precursor with a lithium source, and calcinating at a temperature of 450° C. to 800° C. in a non-oxygen atmosphere, to obtain a silicon-oxygen composite material with a particle size D10 of 3.0 μm to 8.2 μm.

The present disclosure provides an anode material, including the silicon-oxygen composite material, or the silicon-oxygen composite material obtained by the preparation method of the silicon-oxygen composite material.

In some embodiments, the anode material is a composite of graphite and the silicon-oxygen composite material, or a composite of graphite and the silicon-oxygen composite material obtained by the preparation method of the silicon-oxygen composite material.

In some embodiments, the anode material is a composite of lithium titanate and the silicon-oxygen composite material, or a composite of lithium titanate and the silicon-oxygen composite material obtained by the preparation method of the silicon-oxygen composite material.

The present disclosure provides an anode including the silicon-oxygen composite material.

The present disclosure provides a lithium-ion battery, including the silicon-oxygen composite material or the silicon-oxygen composite material obtained by the preparation method of the silicon-oxygen composite material.

BRIEF DESCRIPTION OF DRAWINGS

FIG. 3 is a flow chart of a preparation method of a silicon-oxygen composite material in some embodiments of the present disclosure.

FIG. 4 is an SEM image of the silicon-oxygen composite material provided in Example 2 of the present disclosure.

Figure 1:
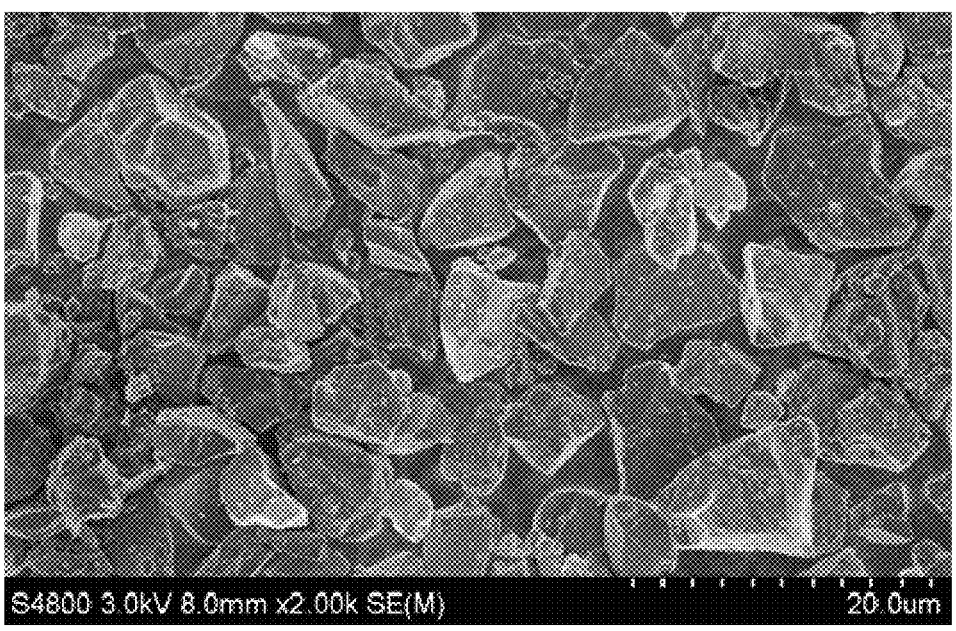
FIG. 1 is an SEM image of the silicon-oxygen composite material provided in Example 1 of the present disclosure.

Drawing markings: 100: silicon-oxygen composite material; 120: lithium-containing compound; 140: non-metallic silicon-containing material; 142: nano-silicon; 144: silicon oxide; 160: carbon layer; 200: battery; 220: cathode; 240: anode; 242: anode current collector; 244: anode active material layer; 260: electrolyte; 280: separator; and 290: housing

DESCRIPTION OF EMBODIMENTS

The advantages of the present disclosure will be partly clarified in the following description, and the others are obvious from the description, or can be obtained through the embodiments of the present disclosure.

Technical solutions of the present disclosure will be further described below with reference to the drawings and embodiments.

In order to make the purpose, technical solutions and advantages of the present disclosure clearer, the present disclosure will be further described in detail below with reference to the drawings and embodiments. It should be understood that the embodiments described here are only used to explain the present disclosure, but not to limit the present disclosure. In addition, the technical features involved in the various embodiments of the present disclosure described below may be combined with each other as long as they do not constitute a conflict with each other. On the premise of not departing from the principles of the embodiments of the present disclosure, improvements and modifications can also be made, and these improvements and modifications will fall in the protection scope of the embodiments of the present disclosure.

Some embodiments provide a silicon-oxygen composite material to solve the problem of poor cycle performance of pre-lithiation materials in the art, so that a silicon-oxygen composite material with excellent cycle performance, as well as initial Coulombic efficiency and gram capacity can be obtained. Other embodiments provide a preparation method of the above silicon-oxygen composite material. Yet other embodiments provide an anode material including the above silicon-oxygen composite material. Still other embodiments provide a battery including the above silicon-oxygen composite material.

I. Silicon-Oxygen Composite Material

In an embodiment, silicon-oxygen composite material 100 includes an inner core and a carbon layer 160 formed on a surface of the inner core. The inner core includes a lithium-containing compound 120 and a non-metallic silicon-containing material 140. Non-metallic silicon-containing material 140 is dispersed in the lithium-containing compound 120. Non-metal silicon-containing material 140 includes at least one of nano-silicon 142 and silicon oxide 144, and at least one of nano-silicon 142 and silicon oxide 144 is dispersed in lithium-containing compound 120.

A size D10 of silicon-oxygen composite material 100 is 3.0 μm to 8.2 μm, 3.2 μm to 8.1 μm, 3.2 μm to 6 μm, or 6 μm to 8.1 μm, such as 3.2 μm, 3.5 μm, 3.8 μm, 4 μm, 4.2 μm, 4.5 μm, 4.8 μm, 5 μm, 5.2 μm, 5.5 μm, 5.8 μm, 6 μm, 6.2 μm, 6.5 μm, 7 μm, 7.2 μm, 7.5 μm, 7.8 μm or 8 μm, and so on.

In the embodiment of the present disclosure, by controlling the particle size D10 of silicon-oxygen composite material 100 to between 3.0 μm and 8.2 μm, on the one hand, the uniformity of the pre-lithiation can be improved, nano-silicon 142 cannot be exposed on a surface of silicon-oxygen composite material 100, and desired improvement of initial Coulombic efficiency and good cycle stability can be obtained; on the other hand, silicon-oxygen composite material 100 has suitable electron and ion conduction channels therein, and internal resistance of silicon-oxygen composite material 100 is relatively small, which can improve a rate performance and a cycle performance of silicon-oxygen composite material 100. If D10<3.0 μm, small particles (nano-silicon 142) are easy to be excessively pre-lithiated during a pre-lithiation process, such that nano-silicon 142 is exposed on the surface of silicon-oxygen composite material 100, which will cause silicon oxidation of silicon-oxygen composite material 100 and reduce the capacity of silicon-oxygen composite material 100; still on the other hand, an expansion due to volume change of nano-silicon 142 during charging and discharging cannot be restrained and suppressed, resulting in poor cycle performance. If D10>8.2 μm, an overall particle size of silicon-oxygen composite material 100 is relatively too large, and the electronic and ion conduction channels inside silicon-oxygen composite material 100 are long, which easily intensifies the polarization phenomenon, increases the internal resistance of silicon-oxygen composite material 100, and leads to properties deterioration of silicon-oxygen composite material 100.

In the embodiment of the present disclosure, lithium-containing compound 120 and carbon layer 160 in the product can effectively suppress a huge volume change of nano-silicon 142 during charging and discharging, and improve the cycle stability of the material; meanwhile, lithium-containing compound 120 can also improve ion conductivity of the material, improve rate of intercalating and deintercalating lithium of nano-silicon 142.

(A) Non-Metallic Silicon-Containing Material 140 and Lithium-Containing Compound 120.

In some embodiments, lithium-containing compound 120 includes, but not limited to, at least one of lithium silicate, lithium carbonate, lithium aluminate, and lithium nitrate.

In some embodiments, lithium-containing compound 120 includes, but not limited to, at least one of lithium chloride, lithium nitride, lithium carbide, lithium sulfide, and lithium sulfate.

In some embodiments, silicon oxide 144 has a chemical formula of SiOx, where (<x≤1.8, for example, x may be 0.2, 0.5, 0.8, 1, 1.2 or 1.5, and so on.

In a range of 0<x≤1.8, an expansion rate of the electrode material can be reduced, the cycle performance of the battery can be improved, and the initial Coulombic efficiency can be improved. If x is 0, that is, there is no oxygen reaction, which will increase the expansion rate of the electrode material and reduce the cycle performance of the material. If x is too large, the proportion of oxygen in the material will be large, and the material efficiency will decrease, thereby reducing the initial Coulombic efficiency. In some embodiments, the chemical formula of silicon oxide 144 is SiOx, where x can be 0<x≤1.8, 0<x<1.8, 0<x≤1.6, 0.2≤x≤1.8 or 0.5≤x<1.8, such as 0, 0.2, 0.4, 0.6, 0.8, 1.0, 1.2, 1.4, 1.6, and 1.8.

In some embodiments, nano-silicon 142 is dispersed in silicon oxide 144, and/or, nano-silicon 142 is dispersed in lithium-containing compound 120.

Figure 7:
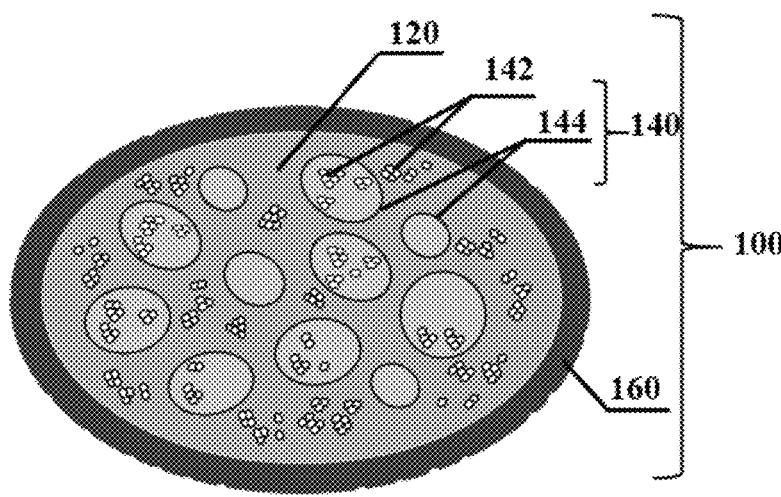
FIG. 7 is a sectional schematic structural view of a silicon-oxygen composite material provided by some embodiments of the present disclosure.

In some embodiments, without being bound by theory, it is believed that nano-silicon 142 is dispersed in silicon oxide 144. In some embodiments, as shown in FIG. 7, a part of nano-silicon 142 is dispersed in silicon oxide 144, and another part of nano-silicon 142 is dispersed in lithium-containing compound 120. In some embodiments, a mass ratio of the nano-silicon 142 dispersed in the silicon oxide 144 to the nano-silicon 142 dispersed in the lithium-containing compound 120 is (15-46):(54-75), for example, the mass ratio can be 15:75, 20:75, 25:75, 35:75, 20:70, 20:60, 20:50, 40:54, 40:60 or 40:73, and so on. Without being bound by theory, it is believed that a dispersion ratio of nano-silicon 142 is within the above ratio ranges, which effectively improves an initial reversible capacity of the material. In some embodiments, a size D50 of the nano-silicon 142 is 0 to 15 nm, and excluding 0, for example, it can be 0.5 nm, 1 nm, 2 nm, 3 nm, 5 nm, 8 nm, 9 nm, 10 nm, 12 nm or 15 nm, and so on.

In some embodiments, an average grain size of nano-silicon 142 is 0 to 15 nm, and excluding 0, for example, it can be 0.5 nm, 1 nm, 2 nm, 3 nm, 5 nm, 8 nm, 9 nm, 10 nm, 12 nm or 15 nm, and so on. Herein, "grain size" refers to a size of the nano-silicon 142 in a crystalline state. In the embodiment, the nano-silicon 142 within the above ranges will not cause expansion of the material and affect cycle performance of the material. If the grain size of the nano-silicon 142 is too large, it will cause expansion of the material, thereby affecting the cycle performance of the material.

In some embodiments, a molar ratio of nano-silicon 142 and lithium-containing compound 120 is (0.5-10):1, for example, it can be 0.5:1, 1:1, 2:1, 3:1, 3.5:1, 4:1, 5:1, 6:1, 7:1, 8:1 or 10:1, and so on. If a content of nano-silicon 142 is too high and a content of lithium-containing compound 120 is too low, it will result in an increased expansion of the material and a deteriorated cycle performance; while if a content of nano-silicon 142 is too high and a content of lithium-containing compound 120 is too low, it will result a weakened electronic conductivity of the material, and the battery to be obtained is seriously polarized, which is not conducive to the performance of the material.

In some embodiments, a molar ratio of the silicon oxide 144 and the lithium-containing compound 120 is (0.2-2):1, for example, it can be 0.2:1, 0.4:1, 0.8:1, 1:1, 1.2:1, 1.5:1, 1.6:1, 1.8:1 or 2:1, and so on. If a content of silicon oxide 144 is too high, an initial Coulombic efficiency of the material is less improved, which leads to a low initial Coulombic efficiency of an electrode made from the material, and a gram capacity of the cathode electrode in the corresponding battery will be hindered; while if a content of silicon oxide 144 is too low, the cycle performance of the material will be deteriorated.

(B) Carbon Layer

In some embodiments, carbon layer 160 is formed on a surface of an inner core of silicon-oxygen composite material 100.

In some embodiments, carbon layer 160 includes at least one of amorphous carbon, graphene sheet, graphitizable soft carbon, carbon fiber, carbon nanotube, and conductive carbon black.

In some embodiments, a mass content of carbon layer 160 is 1% to 15% based on 100% by mass of silicon-oxygen composite material 100, for example, it can be 1%, 2%, 3%, 4%, 4.5%, 5%, 6%, 7%, 8%, 10%, 11.5%, 13% or 15%, and so on.

In some embodiments, in silicon-oxygen composite material 100, carbon layer 160 has a thickness of 200 nm to 1000 nm, for example, it can be 200 nm, 300 nm, 350 nm, 400 nm, 450 nm, 550 nm, 600 nm, 700 nm, 800 nm or 1000 nm, and so on. The thickness of carbon layer 160 falls within a range of 200 nm to 1000 nm, which can further improve conductivity of the material without reducing capacity of the molecular material. If carbon layer 160 is too thin, the conductivity of the material is less improved; while if carbon layer 160 is too thick, capacity of the molecular material is low.

II. Preparation of Silicon-Oxygen Composite

The preparation method of the above silicon-oxygen composite material 100 is provided, a process flow chart of which is shown in FIG. 3, including steps S100 to S300.

Step S100, adjusting a particle size of a silicon source such that a particle size D10 of the silicon source is 2.5 μm to 7.5 μm.

It can be understood that the particle size D10 of the silicon source is controlled to 2.5 μm to 7.5 μm, 2.5 μm to 2.6 μm, 2.6 μm to 5.6 μm, or 5.6 μm to 7.5 μm, for example, it can be 3 μm, 3.5 μm, 4 μm, 4.5 μm μm, 5 μm, 5.5 μm, 6 μm, 6.5 μm or 7 μm, and so on. The particle size D10 of the silicon source is in the range of 2.5 μm to 7.5 μm, which can not only make the particle size D10 of the final silicon-oxygen composite material 100 to 3.0 μm to 8.2 μm, but further improve the uniformity of pre-lithiation in cooperation with the particle size D10 of silicon-oxygen composite material 100 in a range of 3.0 μm-8.2 μm, and ensure again that the nano-silicon 142 is prevented from being exposed to a surface of silicon-oxygen composite material 100. Meanwhile, a further improved initial Coulombic efficiency and good cycle stability can be obtained, such that silicon-oxygen composite material 100 has an excellent electrochemical performance. When the particle size D10 of the silicon source is less than 2.5 μm, excessive pre-lithiation of nano-silicon 142 with small particle size easily occurs during subsequent pre-lithiation process, resulting in deterioration of cycle performance of a final product; while when the particle size D10 of the silicon source is greater than 7.5 μm, these relatively larger particles will cause a long transmission channel for electrons or ions, which is not conducive to overall performance of silicon-oxygen composite material 100, thus leading to deterioration of the initial Coulombic efficiency and cycle performance of the electrode material.

In some embodiments, the silicon source is silicon monoxide.

In some embodiments, the silicon source can be prepared in step S110.

In some embodiments, Step S110, heating a raw material capable of producing silicon oxide gas under an inert atmosphere to produce silicon oxide gas, and obtaining the silicon source after cooling down.

In some embodiments, a method for adjusting a particle size includes at least one of crushing, ball milling, and classification.

In some embodiments, the inert atmosphere includes, but not limited to, at least one of helium atmosphere, neon atmosphere, argon atmosphere, krypton atmosphere, xenon atmosphere, and nitrogen atmosphere.

In some embodiments, a temperature of the heating is 900° C. to 1500° C. In some embodiments, the temperature of the heating can be 950° C., 1000° C., 1050° C., 1100° C., 1150° C., 1200° C., 1250° C., 1300° C., 1350° C., 1400° C. or 1450° C., and so on. In this embodiment, if the temperature of the heating is too high, silicon crystal grains will grow rapidly and the cycle performance will be reduced; while if a roasting temperature is too low, lithium-containing compound 120 will not fully react with the silicon source, such that desired effect of the lithiation cannot be achieved.

In some embodiments, the raw material capable of producing silicon oxide gas is selected any one from the group consisting of: a mixture of Si and $O_2$, or a mixture of $SiO_2$ and carbon, or a mixture of at least two of silicon and a silicon-containing oxide $SiO_m$, where $1 \leq m \leq 6$.

In some embodiments, the raw material capable of producing silicon oxide gas is a mixture of Si and $SiO_2$.

It can be understood that, a ratio of Si and $SiO_2$ in the raw material capable of producing silicon oxide gas is not limited herein, and a person skilled in the art can select according to actual experience. An exemplary molar ratio of Si and $SiO_2$ is 2:1.

Step S200, carbon-coating the silicon source having adjusted particle size to obtain a carbon-containing silicon-oxygen precursor.

In some embodiments, a method for the carbon-coating includes at least one of a gas-phase carbon-coating process and a solid-phase carbon-coating process.

(a) Gas-Phase Carbon-Coating Process:

In some embodiments, the gas-phase carbon-coating process includes: mixing the silicon source having adjusted particle size and an organic carbon source under a protective atmosphere, and heating to obtain the carbon-containing silicon-oxygen precursor.

In some embodiments, a gas in the protective atmosphere includes a gas that does not contain oxygen element.

In some embodiments, the gas in the protective atmosphere includes, but not limited to, at least one of hydrogen, nitrogen, helium, neon, argon, krypton, and xenon.

In some embodiments, the organic carbon source is an organic carbon source that is decomposed to form carbon layer 160 at a heating temperature of 600° C. to 1000° C.

In some embodiments, the organic carbon source includes, but not limited to, at least one of alkane, alkene, alkyne, ketone, and aromatic hydrocarbon.

In some embodiments, the alkane has a formula of $C_mH_{(2m+2)}$, where $1 \leq m \leq 15$.

In some embodiments, the alkane includes, but not limited to, at least one of chain alkane, and cycloalkane.

In some embodiments, the alkane includes, but not limited to, at least one of methane, ethane, propane, butane, isobutane, pentane, isopentane, hexane, and isohexane.

In some embodiments, the alkene has a formula of $C_nH_{2n}$, where $1 \leq n \leq 15$.

In some embodiments, the alkene includes, but not limited to, at least one of ethylene, propylene, butane, and pentene.

In some embodiments, the alkyne has a formula of $C_pH_{(2p-2)}$, where $1 \leq p \leq 15$.

In some embodiments, the alkyne includes at least one of acetylene, propyne, propyne, butyne, and pentyne.

In some embodiments, the ketone includes at least one of acetone, butanone, and pentanone.

In some embodiments, the aromatic hydrocarbon includes at least one of benzene, toluene, ethylbenzene, and propylbenzene.

In some embodiments, the organic carbon source includes at least one of methane, ethylene, acetylene, acetone, and benzene.

In some embodiments, the heating temperature is 600° C. to 1000° C., for example, it can be 650° C., 700° C., 750° C., 800° C., 850° C., 900° C. or 950° C., and so on.

(b) Solid-Phase Carbon-Coating Process:

In some embodiments, the solid-phase carbon-coating process includes: fusing the silicon source having an adjusted particle size with a coated carbon source, and obtaining the carbon-containing silicon-oxygen precursor after carbonization.

In some embodiments, a time of the fusing is 0.2 h to 1 h, for example, it can be 0.3 h, 0.4 h, 0.5 h, 0.6 h, 0.7 h, 0.8 h or 0.9 h, and so on.

In some embodiments, the fusing is performed in a fusion machine, and an optional speed of the fusion machine is 500 r/min to 3000 r/min, for example, it can be 800 r/min, 1000 r/min, 1200 r/min, 1500 r/min, 1800 r/min, 2000 r/min, 2200 r/min, 2500 r/min or 2800 r/min, and so on.

In some embodiments, the coated carbon source includes a carbon material that is easily graphitizable. In some embodiments, the coated carbon source further includes at least one of needle coke, resin, polyol, and enol.

In some embodiments, the coated carbon source includes at least one of coal coke, petroleum coke, sugars, organic acids, and pitch.

In some embodiments, the sugars include, but not limited to, at least one of sucrose, glucose, fructose, or lactose. In some embodiments, the organic acid includes, but not limited to, at least one of carboxyl, sulfonic acid, sulfinic acid, or thiocarboxylic acid.

In some embodiments, the polyol and/or enol include, but not limited to, at least one of polyethylene glycol or polyvinyl alcohol.

In some embodiments, a temperature of the carbonization is 600° C. to 1000° C., for example, it can be 650° C., 700° C., 750° C., 800° C., 850° C., 900° C. or 950° C., and so on.

In some embodiments, a time of the carbonization is 3 h to 10 h, for example, it can be 3.5 h, 4 h, 4.5 h, 5 h, 5.5 h, 6 h, 6.5 h, 7 h, 7.5 h, 8 h, 8.5 h, 9 h or 9.5 h, and so on.

In some embodiments, the carbon-containing silicon-oxygen precursor has a particle size D10 of 3.0 μm to 8.2 μm, 3.2 μm to 8.1 μm, 3.0 μm to 3.2 μm, 3.0 μm to 6 μm, or 6 μm to 8.1 μm, for example, it can be 3.2 μm, 3.5 μm, 3.8 μm, 4 μm, 4.2 μm, 4.5 μm, 4.8 μm, 5 μm, 5.2 μm, 5.5 μm, 5.8 μm, 6 μm, 6.2 μm, 6.5 μm, 7 μm, 7.2 μm, 7.5 μm, 7.8 μm, or 8 μm, and so on. Without being bound by theory, it is believed that the particle size D10 of the carbon-containing silicon-oxygen precursor is obtained based on D10 of silicon-oxygen composite material 100. During the mixing of the carbon-containing silicon-oxygen precursor and the lithium source, since the lithium source passes through the carbon-coating layer of the silicon-oxygen precursor and reacts with silicon oxide 144 in a core of the silicon-oxygen precursor, which basically does not affect the particle size D10 of resulted silicon-oxygen composite material 100 during a preparation process. That is, there is basically no change in the particle size D10 of the material from a form of carbon-containing silicon-oxygen precursor to a form of resulted silicon-oxygen composite material 100.

Step S300, mixing the carbon-containing silicon-oxygen precursor and a lithium source, roasting, to obtain silicon-oxygen composite material 100.

In some embodiments, the lithium source is an oxygen-free lithium compound. Without being bound by theory, it is believed that an oxygen-free lithium source is selected for avoiding the introduction of oxygen due to pre-lithiation, and ensuring a desired improvement in the initial Coulombic efficiency of the material. In addition, an oxygen-free lithium source is selected for increasing a pre-lithiation depth of the material, so as to reduce enrichment of a pre-lithiation product on particle surface, and reduce the risk of the material being difficult to process.

In some embodiments, the lithium source includes at least one of lithium hydride, lithium amide, alkyl lithium, lithium aluminum hydride, lithium element, and lithium borohydride.

In some embodiments, the lithium source has a particle size D10 of 0.5 μm to 10 μm, 1 μm to 9 μm, 2 μm to 8 μm, or 1 μm to 7 μm, for example, it can be 0.5 μm, 1 μm, 2 μm, 3 μm, 4 μm, 5 μm, 6 μm, 7 μm, 8 μm, 9 μm, or 10 μm, and so on. When the particle size D10 of the lithium source is in a range of 0.5 μm to 10 μm, it is safer during usage, and the uniformity of pre-lithiation is further improved by combining the above technical features. If the particle size D10 of the lithium source is less than 0.5 μm, there is a high potential hazard during usage and it is easy to deteriorate; while if the particle size D10 of the lithium source is more than 10 μm, the uniformity of pre-lithiation is reduced, and some particles are excessively pre-lithiated, resulting in decrease of overall performance of the material after pre-lithiation.

In some embodiments, a molar ratio of the carbon-containing silicon-oxygen precursor to the lithium source is (1.4-3):1, and in some embodiments, the molar ratio of the carbon-containing silicon-oxygen precursor to the lithium source is 1.4:1, 1.6:1, 1.8:1, 2:1, 2.2:1, 2.5:1, 2.8:1 or 3:1, and so on. If the molar ratio of carbon-containing silicon-oxygen precursor to lithium source is within the above range, the initial Coulombic efficiency and storage stability of the material can be further improved. If the ratio is too low, that is, a proportion of the carbon-containing silicon-oxygen precursor is too low, a structure of the material is damaged, and the material has poor storage stability which is easy to react with air to cause failure; if the ratio is too high, that is, the proportion of the carbon-containing silicon-oxygen precursor is too high, the initial Coulombic efficiency of the silicon-oxygen material is less improved.

In some embodiments, a method of mixing the carbon-containing silicon-oxygen precursor and the lithium source includes at least one of VC mixing, blending, fusion, kneading, dispersion, and stirring.

In some embodiments, the roasting is performed in a non-oxygen atmosphere.

In some embodiments, the non-oxygen atmosphere includes at least one of a vacuum atmosphere, a hydrogen atmosphere, a nitrogen atmosphere, a helium atmosphere, a neon atmosphere, an argon atmosphere, a krypton atmosphere, and a xenon atmosphere.

In some embodiments, a temperature of the roasting is 300° C. to 1000° C., 300° C. to 600° C., 600 to 800, 600° C. to 800° C., or 800° C. to 1000° C., for example, it can be 350° C., 400° C., 450° C., 500° C., 550° C., 600° C., 650° C., 700° C., 750° C., 800° C., 850° C., 900° C. or 950° C., and so on). When the temperature of the roasting is within the range of 300° C. to 1000° C., the cycle capacity and initial Coulombic efficiency of the material can be maintained at a relatively high level by combining with the above technical features. If the temperature is too low, the reaction is insufficient, resulting in a low initial Coulombic efficiency of the material. If the temperature is too high, nano-silicon 142 grows sharply, resulting in a decrease in cycle performance, and a low retention rate of the cycle capacity of the material. A best performance can be achieved at a temperature of 450° C. to 800° C.

In the above embodiment, the silicon source is firstly coated with carbon, and then mixed with the lithium source to react. The irreversible lithium phase in the silicon source can be consumed in advance by the lithium source. On the one hand, the initial Coulombic efficiency of the silicon-oxygen material can be improved; and on the other hand, obtained lithium-containing compound 120 can effectively buffer a volume change of nano-silicon 142 therein, thus improving the cycle performance of the material. Meanwhile, the pre-coated carbon layer 160 can relieve the severity of the pre-lithiation reaction, and avoid the violent growth of grain of nano-silicon 142 during the pre-lithiation process.

In some embodiments, the preparation method of silicon-oxygen composite material 100 includes the following:

heating a mixture of Si and $SiO_2$ to 900° C. to 1500° C. under an inert atmosphere to produce silicon oxide gas, cooling down, and adjusting particle size, to obtain a silicon source with a particle size D10 of 2.5 μm to 7.5 μm;

carbon-coating the silicon source having adjusted particle size to obtain a carbon-containing silicon-oxygen precursor with a particle size D10 of 3.0 μm to 8.2 μm; and mixing the carbon-containing silicon-oxygen precursor with a lithium source, and calcinating at a temperature of 450° C. to 800° C. in a non-oxygen atmosphere, to obtain silicon-oxygen composite material 100 with a particle size D10 of 3.0 μm to 8.2 μm.

III. Anode Material and Anode

The silicon-oxygen composite material 100 can be used as an anode active material, such as an anode active material in lithium ion battery 200.

In an embodiment, it provides an anode material including the anode material of the silicon-oxygen composite material 100 described above.

In some embodiments, the anode material includes the silicon-oxygen composite material obtained by the above preparation method of the silicon-oxygen composite material.

In some embodiments, the anode material is a composite of graphite and the silicon-oxygen composite material 100 in some embodiments described above.

In some embodiments, the anode material is a composite of graphite and the silicon-oxygen composite material obtained by the above preparation method of the silicon-oxygen composite material.

In some embodiments, the anode material is a composite of lithium titanate and the silicon-oxygen composite material 100 in some embodiments described above.

In some embodiments, the anode material is a composite of lithium titanate and the silicon-oxygen composite material obtained by the above preparation method of the silicon-oxygen composite material.

In some embodiments, the anode material further includes a binder.

In some embodiments, the anode material further includes a conductive agent. In some embodiments, the anode material includes the above silicon-oxygen composite material 100, a binder, and a conductive agent.

In some embodiments, the anode material also includes graphite. In some embodiments, the anode material includes the above silicon-oxygen composite material 100, a binder, a conductive agent, and graphite.

In an embodiment, it provides a method for preparing an anode material, including mixing the above components. In an embodiment, it provides a method for preparing an anode material, including: mixing silicon-oxygen composite material 100, a conductive agent, and a binder. In an embodiment, it provides a method for preparing an anode material, including: mixing silicon-oxygen composite material 100, a conductive agent, a binder, and graphite.

In an embodiment, it provides an anode 240 including silicon-oxygen composite material 100.

Figure 8:
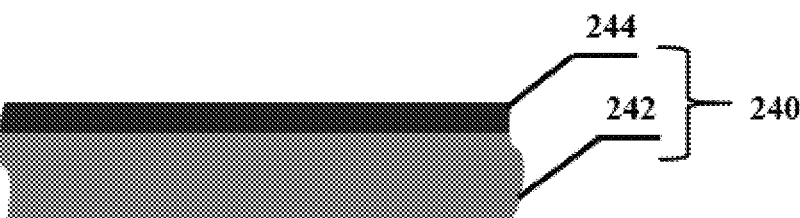
FIG. 8 is a sectional schematic structural view of a cathode provided by some embodiments of the present disclosure.

As shown in FIG. 8, in some embodiments, anode 240 includes: an anode current collector 242 and an anode active material layer 244 on the anode current collector 242, where the anode active material layer 244 includes the above anode material.

In an embodiment, it provides a method for preparing the anode 240, including: coating slurry including anode material on the anode current collector 242.

In some embodiments, an anode 240 is provided, which includes: an anode current collector 242 and an anode active material layer 244 on the anode current collector 242, where the anode active material layer 244 includes the above silicon-oxygen composite material 100. In some embodiments, the anode active material layer 244 further includes a conductive agent and a binder. In some embodiments, the anode active material layer 244 further includes graphite.

In some embodiments, a mass ratio of silicon-oxygen composite material 100, the conductive agent and the binder is (93-98):(1.0-2.0):(1.0-5.0).

In some embodiments, a method for preparing anode 240 is provided, which includes: applying slurry including silicon-oxygen composite material 100 on anode current collector 242 to form anode active material layer 244 on the anode current collector 242; and drying the anode active material layer 244.

In some embodiments, the drying can be a vacuum drying. In some embodiments, a total solid content of the slurry is 30% to 60%. In some embodiments, a total solid content of silicon-oxygen composite material 100, the conductive agent and the binder in the slurry is 30% to 60%.

In some embodiments, a total solid content of silicon-oxygen composite material 100, the conductive agent, the binder and the graphite in the slurry is 30% to 60%.

In some embodiments, before the slurry is applied on the anode current collector 242, the following steps are included: dispersing each component in anode active material layer 244 (such as, silicon-oxygen composite material 100, conductive agent and binder, and optionally, graphite) in a solvent to form the slurry.

In some embodiments, anode current collector 242 can be metal. In some embodiments, anode current collector 242 includes, but not limited to: one of a copper foil current collector and an aluminum foil current collector.

The slurry may contain a solvent. In some embodiments, the solvent includes, but not limited to water.

The binder may improve binding properties between the anode active material particles to each other and to current collector 242. In some embodiments, the binder includes at least one of a non-aqueous binder or an aqueous binder. The non-aqueous binder include, but not limited to, at least one of polyvinyl chloride, carboxylated polyvinyl chloride, polyvinyl fluoride, polymers containing ethanediyloxy, polyvinylpyrrolidone, polyurethane, polytetrafluoroethylene, polyvinylidene fluoride, polyethylene, polypropylene, polyamideimide, or polyimide. The aqueous binder includes, but not limited to, at least one of a rubber-based binder or a polymeric resin binder.

The conductive agent can improve the conductivity of the electrode, and includes, but not limited to, a highly conductive material, such as gold, copper, nickel, aluminum, silver, and/or similar metal powder or metal fiber, and/or a similar metal-based material; or natural graphite, artificial graphite, carbon black, acetylene black, ketjen black, carbon fiber, and/or a similar carbon-based material; or polyphenylene derivatives and/or a similar conductive polymer; and/or mixtures thereof.

IV. Lithium-Ion Battery

In some embodiments, a lithium ion battery 200 is provided, which includes the silicon-oxygen composite material 100 described above.

Figure 9:
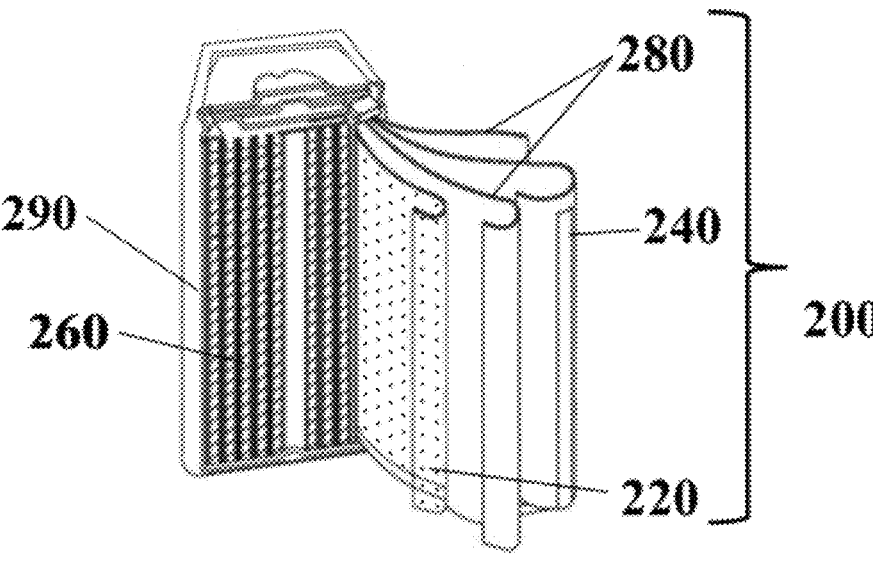
FIG. 9 is a schematic view of a battery provided by some embodiments of the present disclosure.

As shown in FIG. 9, in some embodiments, lithium-ion battery 200 may include: a cathode 220, an anode 240, and an electrolyte 260.

In some embodiments, lithium-ion battery 200 includes:
a cathode 220;
an anode 240; and
an electrolyte 260,
where, the anode 240 includes an anode current collector 242 and an anode active material layer 244 disposed on the anode current collector 242, and the anode active material layer 244 includes silicon-oxygen composite material 100.

As shown in FIG. 9, in some embodiments, the lithium ion battery 200 can include a separator 280 configured between cathode 220 and anode 240. The separator 280 can be a polymeric microporous membrane, such as a polypropylene microporous membrane. The membrane 280 can be commercially available.

In some embodiments, the lithium-ion battery 200 can include a housing 290. The cathode 220, the anode 240, the separator 280, and the electrolyte 260 can be contained in the housing 290.

In some embodiments, lithium-ion battery 200 can be a cylindrical battery, a square battery or a button battery. Lithium-ion battery 200 can be a rigid battery or a pouch battery.

In some embodiments, cathode 220 can include a cathode current collector and a cathode active material layer disposed on the cathode current collector. The cathode active material layer includes a cathode active material capable of reversibly intercalating and deintercalating lithium ions. Examples of the cathode active material includes, but not limited to, one of $LiCoO_2$, $LiNiO_2$, $LiMnO_2$, $LiMn_2 O_4$, $LiNi_{1-xy}$, $CO_xM_yO_2$ ($0 \leq x \leq 1$, $0 \leq y \leq 1$, $0 \leq x+y \leq 1$, and M is a metal such as Al, Sr, Mg, or La), lithium-transition metal oxide.

In some embodiments, electrolyte 260 includes, but not limited to, a non-aqueous organic solvent, such as at least one of carbonate, ester, ether or ketone. In some embodiments, the carbonate includes, but not limited to, at least one of dimethyl carbonate (DMC), diethyl carbonate (DEC), dipropyl carbonate (DPC), methyl propyl carbonate (MPC), ethylene propyl carbonate (EPC), methyl ethyl carbonate (MEC), ethylene carbonate (EC), propylene carbonate (PC), or butylene carbonate (BC). The ester includes, but not limited to, butyrolactone (BL), decanolactone, valerolactone (BL), mevalonolactone, caprolactone (BC), methyl acetate, ethyl acetate, or n-propyl acetate. The ether includes, but not limited to, dibutyl ether. The ketone includes, but not limited to, polymethyl vinyl ketone.

The above embodiment has, but not limited to, the following beneficial effects:

In the above embodiment, a silicon-oxygen composite material 100 structure including an inner core and a carbon layer 160 formed on a surface of the inner core is prepared, where the inner core includes a lithium-containing compound 120 and a non-metallic silicon-containing material 140, and the non-metallic silicon-containing material 140 includes at least one of nano-silicon 142 and silicon oxides 144, the non-metallic silicon-containing material 140 is dispersed in the lithium-containing compound 120, and a particle size D10 of the silicon-oxygen composite material 100 is controlled in a range of 3.0 μm to 8.2 μm, thus the following beneficial effects are brought:

On one hand, an uniformity of pre-lithiation can be improved, and desired initial Coulombic efficiency improvement and good cycle stability can be obtained; on the other hand, silicon-oxygen composite material 100 has suitable electron and ion conduction channels therein, and internal resistance of silicon-oxygen composite material 100 is relatively small, which can improve a rate performance and a cycle performance of silicon-oxygen composite material 100.

Furthermore, the particle size D10 of silicon-oxygen composite material 100 is controlled to be between 3.0 μm and 8.2 μm, while the particle size D10 of the silicon source in the above embodiment is adjusted to 2.5 μm to 7.5 μm, that is, the synergistical control of particle size of the silicon source, which can further improve the uniformity of pre-lithiation, further ensure sufficient coating of nano-silicon 142, and further improve the initial Coulombic efficiency and the good cycle stability; on the other hand, rate perfor-mance and cycle performance of the silicon-oxygen com-posite material can be further improved.

EXAMPLE

The following are typical but non-limiting examples of the present disclosure:

Example 1

A preparation method of a silicon-oxygen composite material, including the following:
> 1 kg of silicon powder and 2.1 kg of silicon dioxide were weighed, put in a vacuum reaction furnace, and reacted at a temperature of 1300° C. for 10 h in an argon atmosphere, then cooled to room temperature. The material was taken out for crushing, ball milling, and classification to obtain silicon monoxide (i.e. silicon source) particles having D10 of 2.6 μm.
> 1 kg of silicon monoxide particles was weighed, and put in a CVD rotary kiln to heat to 800° C. Acetylene gas was fed at a flow rate of 0.5 L/min. A reaction was performed for 100 min, and then cooled down to room temperature. The material was taken out to obtain a carbon-containing silicon monoxide (i.e., carbon-containing silicon-oxygen precursor) particles having D10 of 3.2 μm.
> 1 kg of the carbon-containing silicon monoxide and 200 g of lithium hydride with a particle size D10 of 0.5 μm were weighed, and put in a fusion machine with a rotation speed of 1000 r/min for fusing for 20 minutes. The material was taken out, put in a graphite crucible, placed in an atmosphere furnace with an argon gas introduced for roasting at a temperature of 600° C. for 2 h, and then cooled down to room temperature, to obtain the silicon-oxygen composite material.

The silicon-oxygen composite material prepared in this example has a particle size D10 of 3.2 μm, and includes a silicon oxide as $SiO_x$, (where x=0.8), a nano-silicon, a lithium silicate and a carbon layer. The silicon oxide is dispersed in the lithium silicate, a part of the nano-silicon is dispersed in the silicon oxide, and another part of the nano-silicon is dispersed in the lithium silicate. A molar ratio of the nano-silicon and the lithium silicate is 6:1; and a molar ratio of the silicon oxide and the lithium silicate is 0.2:1.

FIG. 1 is a SEM photograph of the silicon-oxygen com-posite material of this example, from which it can be seen that, the silicon-oxygen composite material has higher uni-formity of particle size, Thus, in this example, the particle size D10 of the silicon source is adjusted to 2.5 μm to 7.5 μm, and the particle size D10 of the silicon-oxygen com-posite material is controlled to 3.0 μm to 8.2 μm, thereby improving the uniformity of pre-lithiation, such that the silicon-oxygen composite material obtains an improved ini-tial Coulombic efficiency and a good cycle stability. With reference to Example 1 in Table 1 relative to Comparative Examples 1 and 2, it can also be seen that the silicon-oxygen composite material of this example has higher initial Cou-lombic efficiency and 50-cycle capacity retention.

Example 2

A preparation method of a silicon-oxygen composite material, including the following:
> 1 kg of silicon powder and 2.1 kg of silicon dioxide were weighed, put in a vacuum reaction furnace, and reacted at a temperature of 1300° C. for 10 h in an argon atmosphere, then cooled to room temperature. The material was taken out for crushing, ball milling, and classification to obtain silicon monoxide particles (i.e. silicon source) having D10 of 5.6 μm.
> 1 kg of silicon monoxide particles was weighed, and put in a CVD rotary kiln to heat to 800° C. Acetylene gas was fed at a flow rate of 0.5 L/min. A reaction was performed for 100 min, and then cooled down to room temperature. The material was taken out to obtain a carbon-containing silicon monoxide particles (i.e., carbon-containing silicon-oxygen precursor) having D10 of 6.0 μm.
> 1 kg of the carbon-containing silicon monoxide and 380 g of lithium aluminum hydride with a particle size D10 of 0.5 μm were weighed, and put in a fusion machine with a rotation speed of 2000 r/min for fusing for 20 minutes. The material was taken out, put in a graphite crucible, placed in an atmosphere furnace with an argon gas introduced for roasting at a temperature of 600° C. for 2 h, and then cooled down to room temperature, to obtain the silicon-oxygen composite material.

The silicon-oxygen composite material prepared in this example has a particle size D10 of 6 μm, and includes a silicon oxide as $SiO_x$, (where x=0.2), a nano-silicon, a lithium silicate and a carbon layer. The silicon oxide is dispersed in the lithium silicate, a part of the nano-silicon is dispersed in the silicon oxide, and another part of the nano-silicon is dispersed in the lithium silicate. A molar ratio of the nano-silicon and the lithium silicate is 3:1; and a molar ratio of the silicon oxide and the lithium silicate is 0.8:1.

FIG. 4 is a SEM photograph of the silicon-oxygen com-posite material in this example, from which it can be seen that, the silicon-oxygen composite material also presents a state of high uniformity of the particle size, meanwhile there is no nano-silicon clusters exposed on a surface of the silicon-oxygen composite material.

Example 3

A preparation method of a silicon-oxygen composite material, including the following:
> 1 kg of silicon powder and 2.1 kg of silicon dioxide were weighed, put in a vacuum reaction furnace, and reacted at a temperature of 1300° C. for 10 h in an argon atmosphere, then cooled to room temperature. The material was taken out for crushing, ball milling, and classification to obtain silicon monoxide particles (i.e. silicon source) having D10 of 7.5 μm.
> 1 kg of silicon monoxide particles was weighed, and put in a CVD rotary kiln to heat to 800° C. Acetylene gas was fed at a flow rate of 0.5 L/min. A reaction was performed for 100 min, and then cooled down to room temperature. The material was taken out to obtain a carbon-containing silicon monoxide particles (i.e., carbon-containing silicon-oxygen precursor) having D10 of 8.1 μm.

1 kg of the carbon-containing silicon monoxide and 220 g of lithium amide with a particle size D10 of 1.5 μm were weighed, and put in a fusion machine with a rotation speed of 1500 r/min for fusing for 20 minutes. The material was taken out, put in a graphite crucible, placed in an atmosphere furnace with an argon gas introduced for roasting at a temperature of 600° C. for 2 h, and then cooled down to room temperature, to obtain the silicon-oxygen composite material.

The silicon-oxygen composite material prepared in this example has a particle size D10 of 8.1 μm, and includes a silicon oxide as $SiO_x$, (where x=1.6), a nano-silicon, a lithium silicate and a carbon layer. The silicon oxide is dispersed in the lithium silicate, a part of the nano-silicon is dispersed in the silicon oxide, and another part of the nano-silicon is dispersed in the lithium silicate. A molar ratio of the nano-silicon and the lithium silicate is 1.1:1; and a molar ratio of the silicon oxide and the lithium silicate is 2:1.

Figure 5:
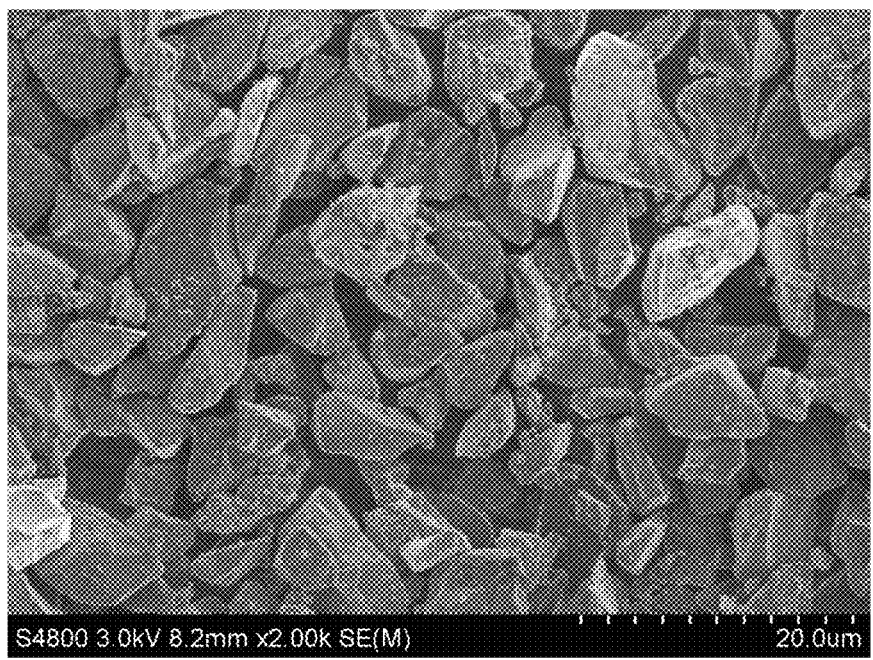
FIG. 5 is an SEM image of the silicon-oxygen composite material provided in Example 3 of the present disclosure.

FIG. 5 is a SEM photograph of the silicon-oxygen composite material of this example, from which it can be seen that, similar to Examples 1 and 2, the particle size of the silicon-oxygen composite material has high uniformity, meanwhile there is no nano-silicon clusters exposed on a surface of the silicon-oxygen composite material.

Example 4

Example 4 differs from Example 1 in that the temperature for roasting is 200° C.

The silicon-oxygen composite material prepared in this example has D10 of 3.2 μm, and includes a silicon oxide $SiO_x$, (where x=1.8), a nano-silicon, a lithium silicate and a carbon layer. A molar ratio of the nano silicon and lithium silicate is 2.3:1; and a molar ratio of the silicon oxide and the lithium silicate is 1:1.

Example 5

Example 5 differs from Example 1 in that the temperature for roasting is 1100° C.

The silicon-oxygen composite material prepared in this example has D10 of 3.2 μm, and includes a silicon oxide $SiO_x$, (where x=0.6), a nano-silicon, a lithium silicate and a carbon layer. A molar ratio of the nano silicon and lithium silicate is 0.8:1; and a molar ratio of the silicon oxide and the lithium silicate is 1.4:1.

Example 6

Example 6 differs from Example 1 in that the silicon monoxide particles have D10 of 2.2 μm, and the particle size D10 of the carbon-containing silicon monoxide particles is the same as that in Example 1.

The silicon-oxygen composite material prepared in this example has D10 of 3.2 μm, and includes a silicon oxide $SiO_x$, (where x=0.9), a nano-silicon, a lithium silicate and a carbon layer. A molar ratio of the nano silicon and lithium silicate is 2.3:1; and a molar ratio of the silicon oxide and the lithium silicate is 1:1.

Example 7

Example 7 differs from Example 3 in that the silicon monoxide particles have D10 of 7.8 μm, and the particle size D10 of the carbon-containing silicon monoxide particles is the same as that in Example 3.

The silicon-oxygen composite material prepared in this example has D10 of 8.1 μm, and includes a silicon oxide $SiO_x$, (where x=1.1), a nano-silicon, a lithium silicate and a carbon layer. A molar ratio of the nano silicon and lithium silicate is 1.1:1; and a molar ratio of the silicon oxide and the lithium silicate is 2:1.

Example 8

Example 8 differs from Example 1 in that the particle size D10 of lithium hydride is 0.2 μm, and other conditions are the same as in Example 1.

The silicon-oxygen composite material prepared in this example has D10 of 3.2 μm, and includes a silicon oxide $SiO_x$ (where x=0.5), a nano-silicon, a lithium silicate and a carbon layer. A molar ratio of the nano silicon and lithium silicate is 10:1; and a molar ratio of the silicon oxide and the lithium silicate is 0.005:1.

Example 9

Example 9 differs from Example 1 in that the particle size D10 of lithium hydride is 15 μm, and other conditions are the same as in Example 1.

The silicon-oxygen composite material prepared in this example as D10 of 3.2 μm, and includes a silicon oxide $SiO_x$ (where x=1.85), a nano-silicon, a lithium silicate and a carbon layer. A molar ratio of the nano silicon and lithium silicate is 0.12:1; and a molar ratio of the silicon oxide and the lithium silicate is 5:1.

Comparative Example 1

Comparative example 1 differs from Example 1 in that the particle size D10 of the silicon monoxide (i.e., silicon source) particles is 2.0 μm, the particle size D10 of the carbon-containing silicon monoxide particles (i.e., carbon-containing silicon-oxygen precursor) is 2.5 μm, and the particle size D10 of the final prepared silicon-oxygen composite material is 2.5 μm. The residual conditions are the same as in Example 1.

Comparative Example 2

Comparative example 2 differs from Example 1 in that the particle size D10 of the silicon monoxide (i.e. silicon source) particles is 10 μm, the particle size D10 of the carbon-containing silicon monoxide particles (i.e., carbon-containing silicon-oxygen precursor) is 10.5 μm, and the particle size D10 of the final prepared silicon-oxygen composite material is 10.5 μm. The residual conditions are the same as in Example 1.

Figure 2:
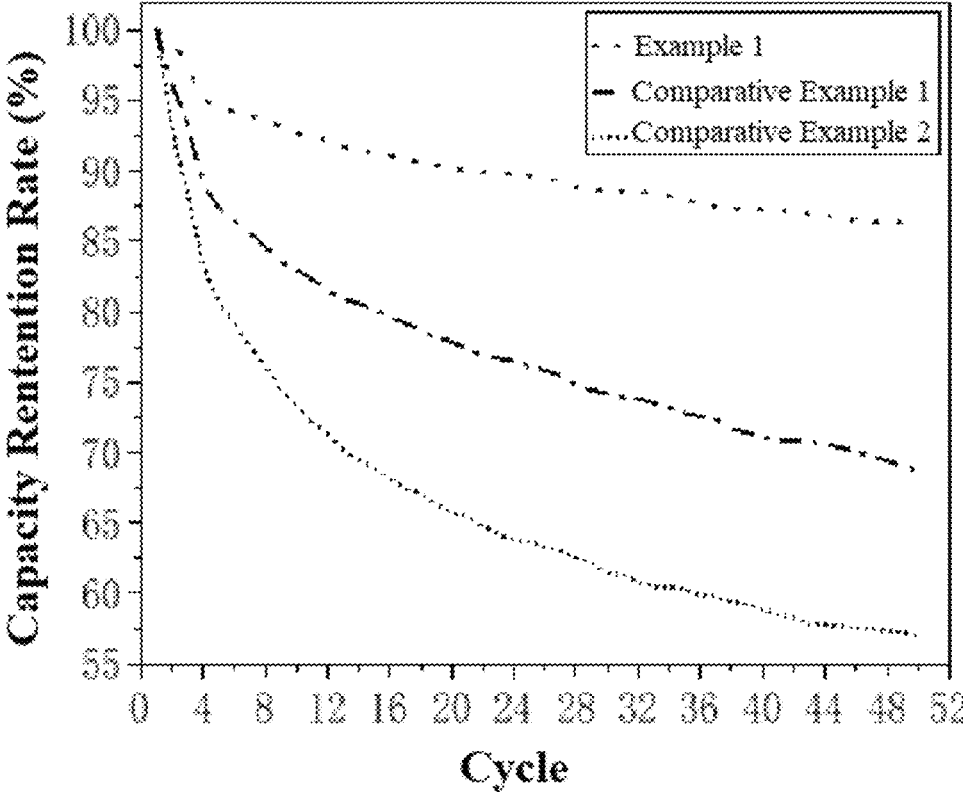
FIG. 2 is a comparison graph of 50-cycly capacity retention rates of half-cells made of silicon-oxygen composite materials provided in Example 1, Comparative Example 1 and Comparative Example 2 of the present disclosure.

FIG. 2 is a comparison graph of 50-cycly capacity retention rates of half-cells made of silicon-oxygen composite materials obtained in Example 1, Comparative Example 1 and Comparative Example 2, from which it can be seen that, the silicon-oxygen composite material obtained in Example 1 has stable cycle performance and reduced capacity fading, while the silicon-oxygen composite materials obtained by the methods of Comparative Examples 1 and 2 have low capacity retention rate and poor cycle performance.

Figure 6:
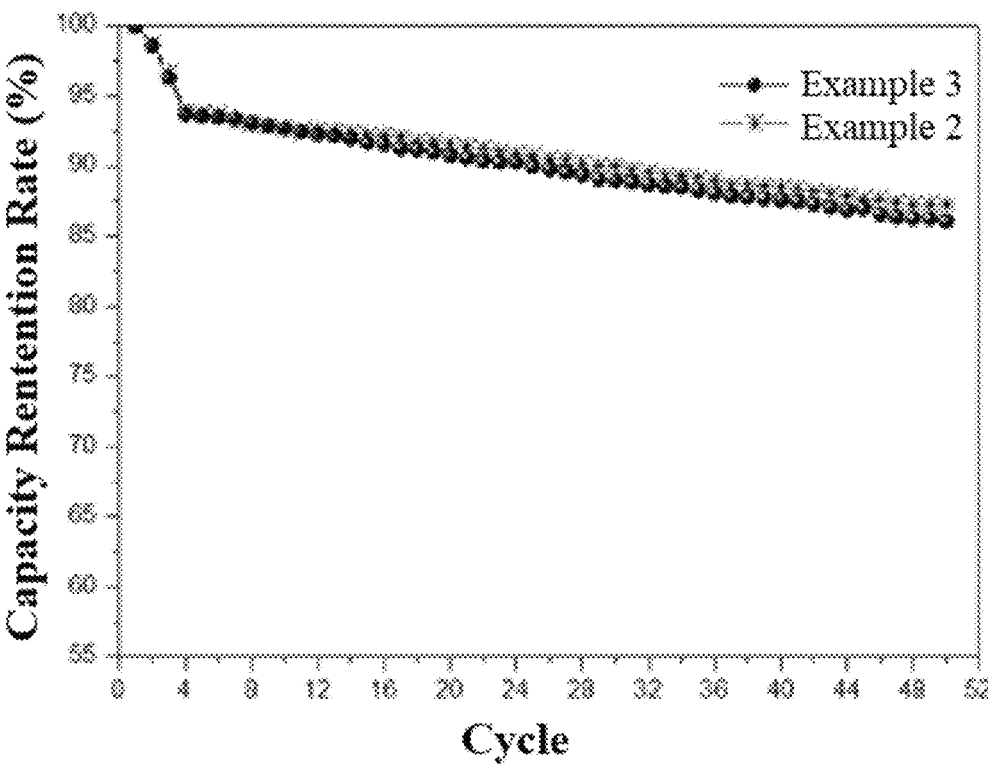
FIG. 6 is a graph of 50-cycly capacity retention rates of half-cells made of the silicon-oxygen composite material provided in Example 2 and Example 3 of the present disclosure.

FIG. 6 is a graph of 50-cycly capacity retention rates of half-cells made of the silicon-oxygen composite material obtained in Example 2 and Example 3, from which it can be seen that, the silicon-oxygen composite materials obtained in Examples 2 and 3 also have stable post-cycle performance and reduced capacity fading.

Performance Testing

The silicon-oxygen composite materials prepared in each of Examples and Comparative Examples are tested for the following performance:

(1) Surface morphology of the samples is observed with a Hitachi S4800 scanning electron microscope;

(2) Particle size of the materials is tested by the Malvern 2000 laser particle size analyzer. The test method includes: putting a dispersant and a tested sample in a 50 mL beaker, adding a certain amount of pure water, stirring well with a glass rod, and conducting the evenly dispersed sample into a measuring cup, and clicking to measure, where each sample was measured for 3 times and an average value thereof was considered as a particle size of the sample.

(3) Cycle performance testing:

I. Preparation of Lithium-Ion Button Cell:

The silicon-oxygen composite material prepared in Examples and Comparative Examples were mixed with graphite uniformly at a mass ratio of 1:9 to obtain a mixture as an active substance, while SBR (styrene-butadiene rubber)+CMC (carboxymethyl cellulose) were mixed at a mass ratio of 1:1, added into water and dissolved to form a uniform solution, which was controlled to has a mass percentage of 1.2% for being a binder. Conductive carbon black was used as a conductive agent. The active material, the conductive agent, and the binder were mixed in a mass ratio of 85:15:10, the obtained mixed slurry was coated on a copper foil anode current collector, where a total solid content of the slurry was controlled to be 50%. Finally, an anode sheet was obtained by drying and rolling, on an upper layer of which was an anode active material layer. A metal lithium sheet (diameter of 10 cm, thickness of 1.2 cm, manufactured by Jiangxi Ganfeng Lithium Industry) was used as a counter electrode, PP/PE (thickness of 16 μm, Shanghai Energy Co., Ltd.) was used as a separator, LiPF$_6$/EC+DEC+DMC (EC, DEC and DMC in a volume ratio of 1:1:1) were used as an electrolyte, and the button cells were assembled in a glove box (Braun glove box) filled with argon.

II. Electrochemical Performance Testing:

50-cycly capacity retention rate (%) test:

50-cycly cycle retention rate (%) =        (Formula 1)

discharge specific capacity at the 50th cycle/ discharge specific capacity at the first cycle×100%;

A LAND 5V/10 mA type battery tester (CT2001A, LAND battery test system of Wuhan Jinnuo Electronics Co., Ltd.) was used to test an electrochemical performance of the battery for 50 cycles. A charging voltage was 1.5 V, a discharging process was performed until to 0.01 V, and a charging and discharging rate was 0.1 C; by measuring the discharge specific capacities of the 1st cycle and the 50th cycle of the battery, a 50-cycle capacity retention rate was calculated. Test data of the silicon-oxygen composite material of Examples 1-9 and Comparative Example 1-2 are shown in Table 1.

(4) First-Cycle Performance Test:

I. Preparation of Lithium Ion Battery:

As shown in FIG. 9, the silicone-oxygen composite material 100 prepared in Examples and Comparative Examples were used as an active material; SBR (styrene-butadiene rubber)+CMC (carboxymethyl cellulose) were mixed at a mass ratio of 1:1, added into water and and dissolved to form a uniform solution, which was controlled to has a mass percentage of 1.2% for being a binder. Conductive carbon black was used as a conductive agent. The active material, the conductive agent, and the binder were mixed in a mass ratio of 85:15:10, the obtained mixed slurry was coated on a copper foil anode collector 242, where a total solid content of the slurry was controlled to be 50%. Finally, an anode sheet 240 was obtained by drying and rolling, on an upper layer of which was an anode active material layer 244. A metal lithium sheet (diameter of 10 cm, thickness of 1.2 cm, manufactured by Jiangxi Ganfeng Lithium Industry) was used as a counter electrode (i.e., cathode 220), PP (polypropylene, thickness of 16 μm, Shanghai Energy Co., Ltd.) was used as a separator, LiPF$_6$/EC+DEC+DMC (EC, DEC and DMC in a volume ratio of 1:1:1) were used as electrolyte 260, and simulated batteries 200 were assembled by using a housing 290 in a glove box (Braun glove box) filled with argon.

II. Electrochemical Performance Testing:

II. Battery Performance Testing

Initial reversible specific capacity (mAh/g): the data was measured by the following LAND 5V/10 mA type battery tester;

Formula of the Initial Coulombic efficiency (%) refers to formula D.3 in D6.1 of "Silicon Carbon" of GB/T 38823-2020, which was tested by the following testing methods and instruments, and calculated according to the formula.

A LAND 5V/10 mA type battery tester (CT2001A, LAND battery test system of Wuhan Jinnuo Electronics Co., Ltd.) was used to test an initial Coulombic efficiency and an initial charge specific capacity of the button battery. A charging voltage was 1.5V, a discharging process was performed until to 0.01 V, and a charging and discharging rate was 0.1 C. Test data of the silicon-oxygen composite materials of Examples 1-9 and Comparative Examples 1-2 are shown in Table 1.

TABLE 1

| | D10 (μm) | Initial charge specific capacity (mAh/g) | Initial Coulombic efficiency (%) | 50-cycle capacity retention rate (%) |
|---|---|---|---|---|
| Example 1 | 3.2 | 480.1 | 91.2 | 86.5 |
| Example 2 | 6.0 | 480.6 | 90.8 | 87.2 |
| Example 3 | 8.1 | 481.2 | 90.7 | 86.1 |
| Example 4 | 3.2 | 480.2 | 88.8 | 86.0 |
| Example 5 | 3.2 | 481.0 | 90.2 | 67.2 |
| Example 6 | 3.2 | 479.8 | 89.8 | 85.2 |
| Example 7 | 8.1 | 480.6 | 87.4 | 81.6 |
| Example 8 | 3.2 | 480.1 | 89.6 | 76.6 |
| Example 9 | 3.2 | 481.3 | 87.5 | 80.3 |
| Comparative example 1 | 2.5 | 480.0 | 89.2 | 68.7 |
| Comparative example 2 | 10.5 | 480.4 | 85.6 | 56.8 |

As shown in Table 1, the capacity, initial Coulombic efficiency, and cycle performance of the silicon-oxygen composite material prepared according to the method of the Examples are all good. In the silicon-oxygen composite material prepared therefrom, the dispersion of nano-silicon is relatively uniform.

Through comparison of Example 1 and Examples 4-5, it can be found that the temperature of the pre-lithiation reaction has a great influence on cycle performance of the material. In Example 1, temperature of the pre-lithiation reaction is controlled within a range of 300° C. to 1000° C., thereby cycle capacity retention and initial Coulombic efficiency of the material are improved. However, in Examples 4-5, an excessively high temperature leads to a reduced cycle capacity retention rate of the material, while an excessively low temperature leads to a reduced initial Coulombic efficiency of the material.

Through comparison of Example 1 and Examples 6-7, it can be found that the particle size D10 of silicon monoxide particles has a significant impact on the property of the material, which can not only further improve the uniformity of pre-lithiation, but also ensure that the nano-silicon is prevented from being exposed on the surface of the silicon-oxygen composite material, as well as obtaining further improved initial Coulombic efficiency and good cycle stability. However, if the particles are too large, the initial Coulombic efficiency and cycle performance of the material are deteriorated; while if the particles are too small, the cycle performance of the material is poor.

Through comparison of Example 1 and Examples 8-9, it can be found that the particle size D10 of the lithium source also has a significant impact on the of the material, and it is safer during a usage process, and the uniformity of pre-lithiation is further improved combining with the above technical features. Too large or too small particle size D10 of the lithium source both do not conducive to the property improvement of the material after pre-lithiation. The reason is that, for the lithium source, when D10=0.2 μm, the particle size is too small, the performance is too active, and it is easy to deteriorate; and when D20=15 μm, the particle size is too large, the uniformity of pre-lithiation is reduced, some particles are easily over-pre-lithiated, resulting in a decrease of property of the material after pre-lithiation.

Through comparison of Example 1 and Comparative Examples 1-2, it can be found that in the example of the present disclosure, the particle size of the carbon-containing silicon-oxygen precursor is in the range of 3.0 μm to 8.2 μm, which can further improve the uniformity of pre-lithiation, and further ensure that nano-silicon 142 is prevented from being exposed on the surface of silicon-oxygen composite material 100, as well as obtaining further improved initial Coulombic efficiency and good cycle stability. When the particle size D10 of the carbon-containing silicon-oxygen precursor is larger than 8.2 μm or smaller than 3 μm, corresponding material has relatively low cycle retention rate. The reason is that, when D10<3.0 μm, these small particles are easy to be excessively pre-lithiated during pre-lithiation, such that the silicon contained is exposed on the surface, and the volume change occurred during repeated charging and discharging processes cannot be buffered and suppressed, resulting in poor cycle performance; and when D10>8.2 μm, the particle in whole is too large, and the electron and ion conduction channels inside the particle are relatively long, resulting in increased electrode polarization and increased internal resistance of the particles, thereby ultimately resulting in a short cycle life of the material. Therefore, Comparative Examples 1-2 have poor performance over Example 1.

The Applicant declares that the present disclosure illustrates the detailed process equipment and process flow of the present disclosure through the above-mentioned examples, but the present disclosure is not limited to the above-mentioned detailed process equipment and process flow, that is, it does not mean that the present disclosure needs to rely on the above—mentioned detailed process equipment and process flow to be implemented. A person skilled in the art should understand that any improvement to the present disclosure, equivalent replacement of each raw material of the product in the present disclosure, addition of auxiliary components, the selection of specific methods, and so on, all fall within the scope of the present disclosure.

INDUSTRIAL APPLICABILITY

The disclosure provides a silicon-oxygen composite material, an anode material, an anode and a lithium ion battery, and a preparation method thereof. The silicon-oxygen composite material provided by the present disclosure has high initial Coulombic efficiency and good cycle stability; on the other hand, the silicon-oxygen composite material has a suitable electron and ion conduction channel therein, small internal resistance, and high-rate performance and cycle stability. The anode material, anode and lithium ion battery prepared therefrom have high initial Coulombic efficiency and high cycle performance.

What is claimed is:

1. A silicon-oxygen composite material, comprising an inner core and a carbon layer formed on a surface of the inner core,
   wherein the inner core comprises a lithium-containing compound and a non-metallic silicon-containing material, the non-metallic silicon-containing material comprises nano-silicon and silicon oxide, the non-metallic silicon-containing material is dispersed in the lithium-containing compound;
   wherein the silicon-oxygen composite material has a D10 of 3.0 μm to 8.2 μm.

2. The silicon-oxygen composite material of claim 1, wherein the lithium-containing compound comprises at least one of lithium silicate, lithium carbonate, lithium aluminate, and lithium nitrate; and/or
   the silicon oxide has a chemical formula of $SiO_x$, wherein $0<x\leq1.8$; and/or
   the nano-silicon is dispersed in the silicon oxide, and/or, the nano-silicon is dispersed in the lithium-containing compound; and/or
   a mass ratio of the nano-silicon dispersed in the silicon oxide to the nano-silicon dispersed in the lithium-containing compound is (15-46):(54-75); and/or
   the nano-silicon has a D50 of 0 to 15 nm, and excluding 0.

3. The silicon-oxygen composite material of claim 1, wherein the lithium-containing compound comprises at least one of lithium chloride, lithium nitride, lithium carbide, lithium sulfide, and lithium sulfate.

4. The silicon-oxygen composite material of claim 1, wherein a molar ratio of the nano-silicon to the lithium-containing compound is (0.5-10):1 and/or
   a molar ratio of the silicon oxide to the lithium-containing compound is (0.2-2):1; and/or
   the carbon layer comprises at least one of amorphous carbon, graphene sheet, graphitizable soft carbon, carbon fiber, carbon nanotube, and conductive carbon black; and/or
   a mass content of the carbon layer is 1% to 15% based on 100% by mass of the silicon-oxygen composite material; and/or
   the carbon layer has a thickness of 200 nm to 1000 nm.

5. An anode material, comprising the silicon-oxygen composite material of claim 1.

6. The anode material of claim 5, wherein the anode material is a composite of graphite and the silicon-oxygen composite material.

7. The anode material of claim 5, wherein the anode material is a composite of lithium titanate and the silicon-oxygen composite material.

8. A preparation method of a silicon-oxygen composite material, comprising the followings:

adjusting a particle size of a silicon source such that a particle size D10 of the silicon source is 2.5 μm to 7.5 μm;

carbon-coating the silicon source having adjusted particle size to obtain a carbon-containing silicon-oxygen precursor; and mixing the carbon-containing silicon-oxygen precursor and a lithium source, roasting, to obtain the silicon-oxygen composite material;

wherein the silicon-oxygen composite material has a particle size D10 of 3.0 μm to 8.2 μm.

9. The preparation method of claim 8, wherein a method for preparing the silicon source comprises: heating a raw material capable of producing silicon oxide gas under an inert atmosphere to produce silicon oxide gas, and obtaining the silicon source after cooling down.

10. The preparation method of claim 9, comprising at least one of the following features (1) to (5):

(1) the silicon source is silicon monoxide;

(2) the inert atmosphere comprises at least one of helium atmosphere, neon atmosphere, argon atmosphere, krypton atmosphere, xenon atmosphere, and nitrogen atmosphere;

(3) a temperature of the heating is 900° C. to 1500° C.;

(4) the raw material capable of producing silicon oxide gas is a mixture of Si and $SiO_2$;

(5) a method for adjusting a particle size comprises at least one of crushing, ball milling, and classification.

11. The preparation method of claim 8, wherein a method for the carbon-coating comprises at least one of a gas-phase carbon-coating process and a solid-phase carbon-coating process; and/or the gas-phase carbon-coating process comprises: mixing the silicon source having adjusted particle size and an organic carbon source under a protective atmosphere, and heating to obtain the carbon-containing silicon-oxygen precursor; and/or the solid-phase carbon-coating process comprises: fusing the silicon source having an adjusted particle size with a coated carbon source, and obtaining the carbon-containing silicon-oxygen precursor after carbonization.

12. The preparation method of claim 11, wherein a gas in the protective atmosphere comprises at least one of hydrogen, nitrogen, helium, neon, argon, krypton, and xenon; and/or the organic carbon source comprises at least one of methane, ethylene, acetylene, acetone, and benzene; and/or the heating temperature is 600° C. to 1000° C.; and/or a time of the fusing is 0.2 h to 1 h; and/or the coated carbon source comprises at least one of coal coke, petroleum coke, sugar, organic acid, and pitch; and/or a temperature of the carbonization is 600° C. to 1000° C.; and/or a time of the carbonization is 3 h to 10 h; and/or the carbon-containing silicon-oxygen precursor has a particle size D10 of 3.0 μm to 8.2 μm.

13. The preparation method of claim 11, wherein the carbon source comprises an organic carbon source that is decomposed to form a carbon layer at 600° C. to 1000° C.; and/or the organic carbon source comprises at least one of alkane, alkene, alkyne, ketone, and aromatic hydrocarbon; and/or the coated carbon source comprises at least one of needle coke, resin, polyol, and enol.

14. The preparation method of claim 8, wherein the lithium source comprises an oxygen-free lithium compound; and/or the lithium source comprises at least one of lithium hydride, lithium amide, alkyl lithium, lithium aluminum hydride, lithium element, and lithium borohydride; and/or the lithium source has a particle size D10 of 0.5 μm to 10 μm; and/or a molar ratio of the carbon-containing silicon-oxygen precursor to the lithium source is (1.4-3):1; and/or a manner of mixing the carbon-containing silicon-oxygen precursor and the lithium source comprises at least one of VC mixing, blending, fusion, kneading, dispersion, and stirring; and/or the roasting is performed in a non-oxygen atmosphere; and/or the non-oxygen atmosphere comprises at least one of a vacuum atmosphere, a hydrogen atmosphere, a nitrogen atmosphere, a helium atmosphere, a neon atmosphere, an argon atmosphere, a krypton atmosphere, and a xenon atmosphere; and/or a temperature of the roasting is 300° C. to 1000° C.

15. The preparation method of claim 8, comprising the following:

heating a mixture of Si and $SiO_2$ to 900° C. to 1500° C. under an inert atmosphere to produce silicon oxide gas, cooling down, and adjusting particle size, to obtain a silicon source with a particle size D10 of 2.5 μm to 7.5 μm;

carbon-coating the silicon source having adjusted particle size to obtain a carbon-containing silicon-oxygen precursor with a particle size D10 of 3.0 μm to 8.2 μm; and mixing the carbon-containing silicon-oxygen precursor with a lithium source, and calcinating at a temperature of 450° C. to 800° C. in a non-oxygen atmosphere, to obtain a silicon-oxygen composite material with a particle size D10 of 3.0 μm to 8.2 μm.

* * * * *